US012643455B2

(12) United States Patent
Ng et al.

(10) Patent No.: US 12,643,455 B2
(45) Date of Patent: Jun. 2, 2026

(54) TROLLEY TRANSPORT VEHICLE

(71) Applicant: Logistics and Supply Chain MultiTech R&D Centre Limited, Pok Fu Lam (HK)

(72) Inventors: Wang Fei Ng, Pok Fu Lam (HK); Lok Shing Leung, Pok Fu Lam (HK); Hong Man Wong, Pok Fu Lam (HK); Shu Hang Ip, Pok Fu Lam (HK); Hiu Yan Yeung, Pok Fu Lam (HK); King Sau Wong, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 328 days.

(21) Appl. No.: 18/476,505

(22) Filed: Sep. 28, 2023

(65) Prior Publication Data

US 2025/0108748 A1 Apr. 3, 2025

(51) Int. Cl.

| | |
|---|---|
| ***B60P 1/64*** | (2006.01) |
| ***B60P 7/13*** | (2006.01) |
| ***B65G 67/02*** | (2006.01) |
| ***G01S 17/931*** | (2020.01) |

(52) U.S. Cl.

CPC ................. *B60P 1/649* (2013.01); *B60P 7/13* (2013.01); *B65G 67/02* (2013.01); *G01S 17/931* (2020.01); *B65G 2201/02* (2013.01)

(58) Field of Classification Search

CPC . B60P 1/649; B60P 7/13; B65G 67/02; B65G 2201/02; G01S 17/931

USPC ............................................................. 701/2

See application file for complete search history.

(56) References Cited

U.S. PATENT DOCUMENTS

| | | | | |
|---|---|---|---|---|
| 6,039,375 | A * | 3/2000 | Bauman | B25J 15/0253 901/31 |
| 2018/0281178 | A1* | 10/2018 | Jacobsen | B25J 13/086 |
| 2020/0376671 | A1* | 12/2020 | Taylor | B25J 9/1687 |
| 2024/0025058 | A1* | 1/2024 | Johnson | B25J 18/025 |
| 2024/0359958 | A1* | 10/2024 | Jeong | B66F 9/063 |
| 2025/0178187 | A1* | 6/2025 | Otani | B25J 9/0093 |
| 2025/0187170 | A1* | 6/2025 | Oka | B25J 11/008 |

FOREIGN PATENT DOCUMENTS

| | | | | |
|---|---|---|---|---|
| EP | 3372541 | A1 * | 9/2018 | B66F 9/063 |
| EP | 3995792 | B1 * | 12/2023 | G01G 19/086 |

* cited by examiner

*Primary Examiner* — Isaac G Smith

(74) *Attorney, Agent, or Firm* — Renner, Kenner, Greive, Bobak, Taylor & Weber

(57) ABSTRACT

A system and method for a trolley transport vehicle for transporting a trolley including a chassis, a drive system disposed on the chassis and configured to propel the trolley transport vehicle, a gripper assembly disposed on the chassis, the gripper assembly including a gripper support and at least one gripper mounted on and supported by the gripper support, wherein the at least one gripper is arranged to releasably grasp a trolley, a controller operatively connected to the drive system, the controller configured to control the drive system to move the trolley transport vehicle, the chassis configured to pivot about a central lateral axis.

20 Claims, 7 Drawing Sheets

TROLLEY TRANSPORT VEHICLE

TECHNICAL FIELD

The present invention relates to a trolley transport vehicle, and particularly, although not exclusively to an automated trolley transport vehicle.

BACKGROUND

Trollies (or trolleys) are commonly used to transport goods around in various indoor and outdoor environments. Trollies are commonly used to transport linen or clothes in various environments such as warehouses, laundromats, hotels, hospitals etc. Traditional linen trollies can be quite heavy and challenging to move around for workers (i.e., people). Often the trollies once fully loaded can weigh up to 200 kg. Workers have to push and/or pull these loaded trollies between locations. This can be quite laborious and can cause injury. In some instances, dollies or other tools can be used, however these tools also require manual operation by workers. This manual labour and exertion can lead to injury.

SUMMARY OF THE INVENTION

The present invention is directed to a trolley transport vehicle which will overcome or substantially ameliorate at least some of the deficiencies of the prior art, or to at least provide an alternative.

The present invention relates to a trolley transport vehicle, in particular, but not limited to an automated trolley transport vehicle. The automated trolley transport vehicle may be configured to autonomously locate a target trolley, move to the target trolley, engage the trolley and transport i.e., move the trolley to a destination.

Alternatively, the trolley transport vehicle may be configured to be remote controlled via a user device such as for example a mobile device, a smartphone, a tablet, a smart watch or other user device with wireless communication capability.

The present invention further relates to a trolley transport method. The trolley transport method defines the operation of the trolley transport vehicle to locate, engage and transport a trolley.

In accordance with an aspect, the present invention provides a trolley transport vehicle for transporting a trolley comprising:

a chassis, a drive system disposed on the chassis and configured to propel the trolley transport vehicle, a gripper assembly disposed on the chassis, the gripper assembly comprising a gripper support and at least one gripper mounted on and supported by the gripper support, wherein the at least one gripper is arranged to releasably grasp a trolley, a controller operatively connected to the drive system, the controller configured to control the drive system to move the trolley transport vehicle and the grasped trolley, the chassis configured to pivot about a central lateral axis.

In one example the drive system comprises a drive motor and one or more drive wheels, the drive wheels being positioned at a centre of the chassis, and the chassis is pivotable about a rotational axis of the one or more drive wheels.

In one example the one or more drive wheels are rotatable about a lateral axle, and the chassis is pivotable about the axle of the one or more drive wheels.

In one example the drive system comprises two drive wheels, the drive wheels being disposed at a centre of the chassis, the two drive wheels being coaxial and rotatable about a common axle, and the chassis being pivotable the axle of both drive wheels.

In one example the two drive wheels may be independently controllable. The trolley transport vehicle may comprise two drive motors, wherein one drive motor is operatively connected to one drive wheel and is configured to operate that drive wheel. In this example, the motors may be controlled to power the wheels in opposing directions to cause the vehicle to turn. The drive wheels being independently controllable allows for finer control i.e., movement control. The independently driveable drive wheels are further advantageous as the vehicle can be turned within a very small turning radius. This allows the trolley transport vehicle to be moved and controlled in tight spaces e.g., in corridors or small rooms.

In one example the chassis comprises a first base plate, a second base plate and a frame, the drive system is mounted on the frame, the frame positioned substantially in the middle of the trolley transport vehicle, the first base plate coupled to the frame by a first pivot such that the first base plate can rotate relative to the frame, the second base plate coupled to the frame by a second pivot such that the second base plate can rotate relative to the frame, the first base plate and second base plate being independently rotatable relative to the frame.

In one example the trolley transport vehicle comprises one or more non-contact proximity sensors, the one or more non-contact proximity sensors are positioned on the chassis and configured to detect one or more objects.

In one example the one or more non-contact proximity sensors are wave emitting sensors configured to transmit waves and detect one or more objects based on analysing reflected waves.

In one example the trolley transport vehicle comprises two non-contact proximity sensors, a first non-contact proximity sensor positioned on the front of the chassis and a second non-contact proximity sensor positioned on the rear of the chassis, and wherein the non-contact proximity sensors are configured to scan an environment to detect one or more objects.

The non-contact proximity sensors are configured to detect an object or obstacle e.g., a trolley and other obstacles in a non-contact way i.e., based on measuring and processing reflected signals.

In one example the non-contact proximity sensors are Lidar sensors. In another example, the non-contact proximity sensors may be acoustic sensors e.g., ultrasonic sensors that are configured to transmit acoustic signals. In a further alternative the proximity sensors may be infrared sensors that are configured to transmit an infrared signal.

In one example controller may be configured to receive signals from the non-contact proximity sensors and process the received signals. The received signals may be signals reflected off one or more objects. The controller is configured to process the reflected signals to detect an object. The controller may also detect the position of the objects based on the time of flight of the reflected signals. For example, the controller may utilise a doppler calculation.

In one example the gripper support is configured to move laterally to align the grippers with a trolley. The gripper support may be configured to move horizontally to account for misalignment between the grippers and a target trolley. The target trolley is a trolley that is required to be transported.

In one example the gripper support is configured to move longitudinally relative to the chassis. Longitudinally means the gripper support can move forward and backward to align with a target trolley.

In one example the gripper support is moveable in a forward direction or along a longitudinal axis of the trolley transport vehicle toward the front of the chassis.

In one example the gripper assembly comprising a gripper rack attached to the chassis and extending from the chassis, the gripper support being held by the gripper rack, the gripper support moveable laterally relative to the rack, and;

the rack comprising a lock mechanism that is configured to lock the gripper support in position.

In one example the trolley transport vehicle comprising one or more dampers, the one or more dampers located on the gripper support or the gripper rack, and;

wherein the one more dampers are configured to absorb an impact from a trolley as the trolley transport vehicle is moved into a grasping position.

In one example the trolley transport vehicle comprising two dampers, the dampers being disposed on the gripper rack and the dampers being arranged parallel to each other and oriented to be moveable parallel with a longitudinal axis of the trolley transport vehicle.

In one example the gripper support comprising a telescoping arrangement that is adapted to adjust the lateral distance between the grippers.

In one example the telescoping arrangement comprising two horizontal rails that can move relative to each other, a first gripper mounted on a free end of the first horizontal rail and a second gripper mounted on a free end of the second horizontal rail, the telescoping arrangement further comprising gripper support actuator operatively connected to the rails and configured to move the rails horizontally away from each other or toward each other such that the distance between the first gripper and second gripper is increased or decreased.

In one example the gripper support actuator may be a motor e.g., a linear motor. The motor may be configured to operatively connect to the rails and may be configured to move the rails.

In one example a first Lidar sensor is positioned on a front of the chassis and is oriented to transmit light signals in forward direction, wherein a second Lidar sensor is positioned on a back of the chassis and is oriented to transmit light signals in a rearward direction, and;

wherein the transmitted light in the forward and rearward direction are used to scan an environment and detect one or more objects based on the reflected light.

In one example the gripper comprising a clamp, a guide plate a position sensor and a gripper actuator, wherein the clamp is moveable relative to the guide plate to accommodate a portion of a trolley to grip, the position sensor is fixed on or adjacent the clamp and configured to sense a portion of the trolley, the gripper actuator connected to the clamp and configured to move the clamp to accommodate a portion of the trolley, and;

the gripper further comprising a lock that is engageable or disengageable, such that when the lock is engaged the clamp is locked and restricted from moving.

In one example the trolley transport vehicle is an automated guided vehicle, wherein the trolley transport vehicle further comprises a communication interface operatively coupled to the controller, the communication interface configured to wirelessly communicate with a user device to receive one or more instructions from the user device, wherein the one or more instructions defining operation of the trolley transport vehicle and the controller configured to control the drive system and the gripper support to engage and move a trolley as per the instructions.

The controller may be configured to control the trolley support and the grippers to adjust to align with a target trolley such that the grippers are aligned with one or more surfaces for gripping the trolley.

In one example the trolley transport vehicle is configured to autonomously locate and engage a trolley by the grippers and transport the trolley from one location to a destination, wherein the destination may be defined in the instructions.

In one example the trolley transport vehicle may comprise a positioning interface (i.e., a positioning module). The positioning interface may be a GPS interface is configured to communicate with a guidance system e.g., a GPS system. The controller may be configured to receive waypoints or a path and navigate the trolley transport vehicle. The navigation path may define a target trolley and the destination for the target trolley. The controller may be configured to control the trolley transport vehicle (i.e., the trolley transport AGV) to find a target trolley, engage the target trolley (i.e., grasp it in the grippers) and then transport the engaged trolley to the defined destination.

The term “comprising” (and its grammatical variations) as used herein are used in the inclusive sense of “having” or “including” and not in the sense of “consisting only of”.

BRIEF DESCRIPTION OF THE DRAWINGS

Embodiments of the present invention will now be described, by way of example, with reference to the accompanying drawings in which.

DETAILED DESCRIPTION OF THE PREFERRED EMBODIMENTS

The present invention relates to a trolley transport vehicle that is configured to relocate i.e., transfer a trolley from one location to another.

Figure 1:
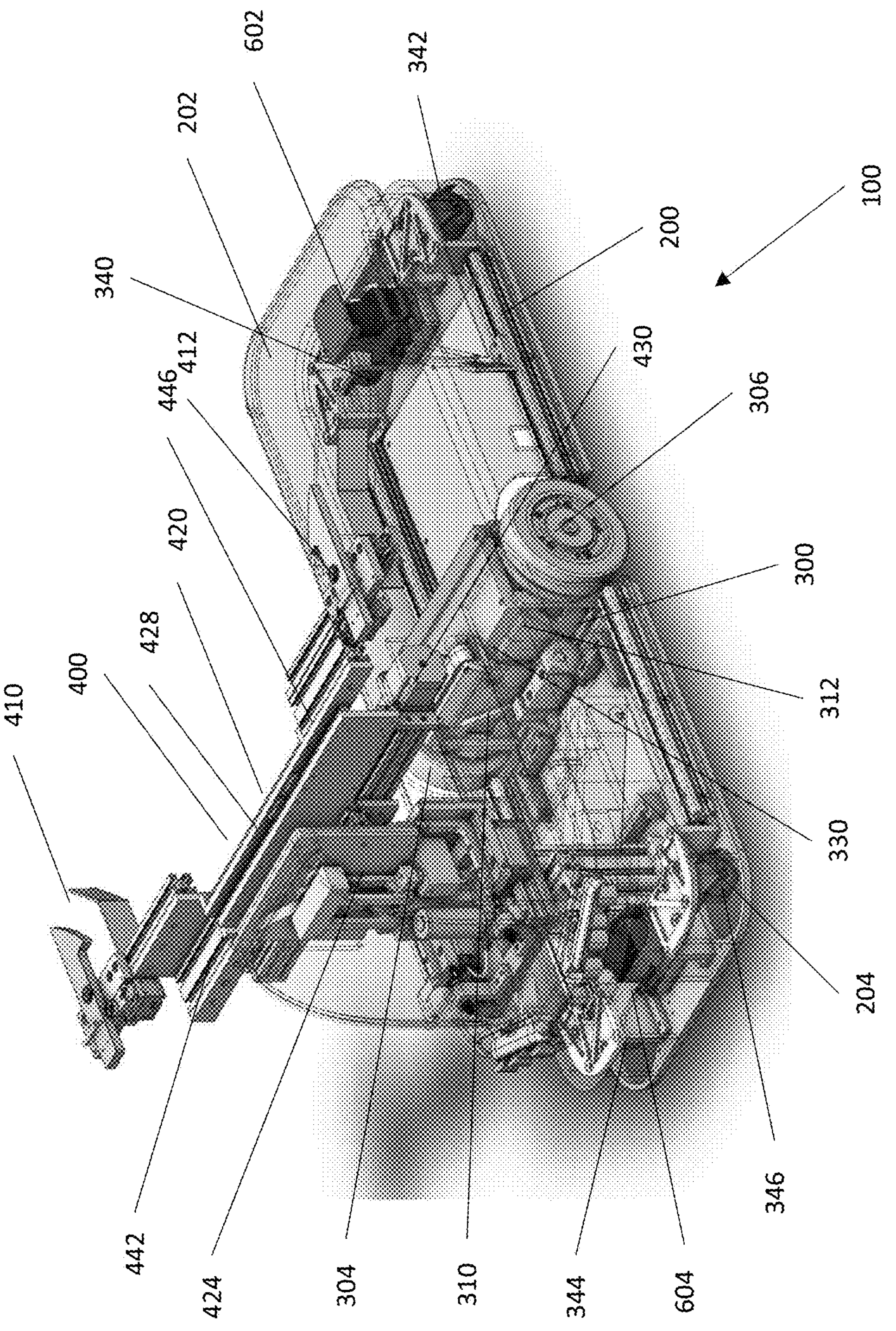
FIG. 1 illustrates an example trolley transport vehicle for transporting trollies.

Referring to FIG. 1, an embodiment of the present invention is illustrated. This embodiment is arranged to provide a trolley transport vehicle 100 comprising: a chassis, a drive system disposed on the chassis and configured to propel the trolley transport vehicle, a gripper assembly disposed on the chassis and laterally moveable relative to the chassis, the gripper assembly comprising a gripper support and at least one gripper mounted on and supported by the gripper support, wherein the at least one gripper is arranged to releasably grasp a trolley, a controller operatively connected to the drive system, the controller configured to control the drive system to move the trolley transport vehicle and the grasped trolley, the chassis configured to pivot about a central lateral axis.

The trolley transport vehicle may be an automated vehicle. In one example the trolley transport vehicle may be an autonomous guided vehicle (AGV). The trolley transport vehicle may be substantially autonomous and may be a robot.

At least some functions may be automated. The trolley transport AGV may be controllable by a user via a user device such as for example a smartphone, tablet, laptop etc. The user device may function as a remote control. The trolley transport vehicle may be configured to automatically align with and engage i.e., grasp a trolley, and move the trolley.

Alternatively, the trolley transport vehicle may be fully automatic. In this fully automatic (i.e., fully automated) example the trolley transport vehicle may be programmable with instructions to automatically locate a trolley, grasp a trolley and move the trolley. The trolley transport robot may be an automated vehicle that is configured to engage a trolley and transfer it from one location to another.

The trolley transport vehicle (i.e., trolley transport robot) comprises a chassis 200, a drive system 300 disposed on the chassis. The drive system 300 may be configured to propel the trolley transport robot 100. The drive system 300 may further include steering functions to steer the trolley transport vehicle 100 (i.e., trolley transport robot). The drive system 300 may be configured to control the vehicle 100 to avoid obstacles, move from one location to another, adjust its position to align with a target trolley, and control other functions.

The trolley transport vehicle 100 comprises a gripper assembly 400 disposed on the chassis 200. The gripper assembly 400 comprises one or more grippers and a gripper support 420. The gripper assembly comprises a first gripper 410 and a second grippers 412 may be mounted on and supported by the gripper support 420. At least one gripper of the one or more grippers 410, 412 is configured to releasably grasp a trolley e.g., a target trolley that is to be moved.

The trolley transport vehicle 100 further comprises a controller 500 operatively connected to the drive system 300 and the gripper assembly 400. The controller 500 may be configured to control the drive system 300 to move the trolley transport vehicle 100 from one location to another. If the trolley vehicle 100 has grasped a trolley, then the trolley is moved due to movement of the trolley transport vehicle 100.

The controller 500 may be configured to control and move the gripper support 420 laterally. The controller 500 may also be configured to control the gripper 410, 412 to grasp a trolley or release a trolley. The gripper assembly 400 may comprise a gripper support actuator that is configured to telescope the gripper support. The controller 500 may be operatively connected to the gripper actuator and control movement of the gripper support. The vehicle 100 may further comprise a gripper actuator that is associated with each gripper 410, 412. Each gripper 410, 412 may be coupled to a gripper actuator. The controller 500 may be configured to control the gripper actuator to cause the gripper to grasp or release a trolley.

Figure 2:
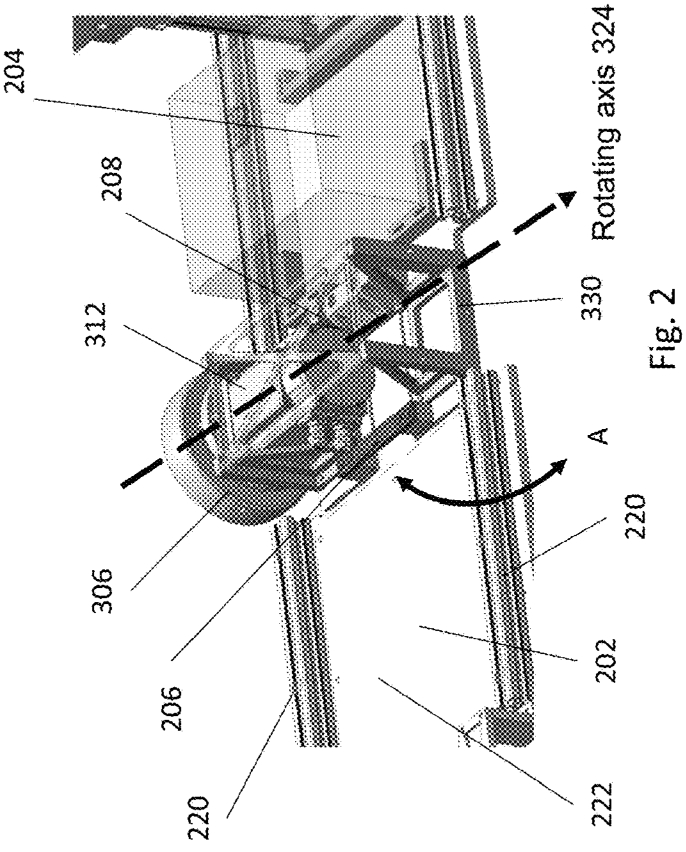
FIG. 2 illustrates an example of a central frame of the trolley transport vehicle and the two base plates that define the chassis.

The drive system 300 comprises a drive motor and one or more drive wheels. Referring to FIG. 1 and FIG. 2, the vehicle 100 comprises two drive wheels 304, 306. The drive wheels 304, 306 are located substantially in the centre of the chassis 200.

The chassis 200 is configured to pivot about a central, lateral axis of the trolley transport vehicle. The chassis 200 may be shaped and structured to pivot about a central, lateral (i.e., horizontal axis) of the vehicle 100. The drive wheels 304, 306 are located at opposing lateral sides of the chassis 200. The drive system 300 may comprise at least one actuator (e.g., a motor) that is coupled to the drive wheels 304, 306 and operatively connected to the controller 500. In the illustrated example the trolley transport vehicle 100 comprises two drive motors 310, 312. The first drive motor 310 is connected to and powers the first drive wheel 304. The second drive motor 312 is connected to the second drive wheel 306. The controller 500 is configured to control the first and second drive motors 310, 312 independently. This allows the drive wheels to be independently controllable.

The motors 310, 312 may be controlled to power the wheels in opposing directions to cause the vehicle to turn. The motors may be controlled to drive each wheel in the same direction to drive the vehicle 100 in a direction. The motors 310, 312 may each control each wheel at different speeds to cause the vehicle 100 to make small turns. The drive wheels being independently controllable allows for finer control i.e., movement control. The independently driveable drive wheels are further advantageous as the vehicle can be turned within a very small turning radius. This allows the trolley transport vehicle to be moved and controlled in tight spaces e.g., in corridors or small rooms. The independently controllable motors 310, 312 and wheels 304, 306 avoid the need for a steering mechanism as turning and movement is controlled by changing the speed and/or direction of each wheel moving.

In an alternate configuration the vehicle 100 may comprise a single drive motor. The single drive motor may be operatively connected to each wheel and may be controlled to drive the wheels 304, 306. In this alternate configuration the vehicle 100 may comprise a steering mechanism that is coupled to the wheels and allows the wheels to be turned to steer the vehicle 100. A steering mechanism may also be used in the configuration that includes two motors 310, 312 and independently driveable wheels.

Figure 3:
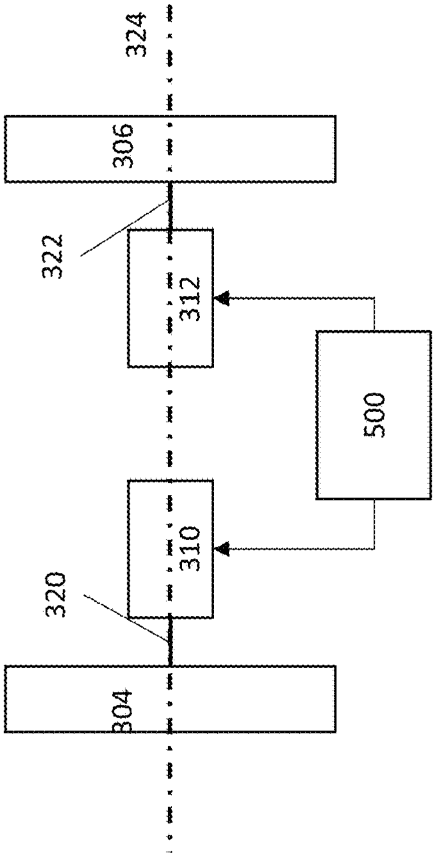
FIG. 3 illustrates a schematic diagram of the drive system of the trolley transport vehicle.

The wheels 304, 306 may be located at substantially the centre of the chassis 200. The drive wheels 304, 306 more specifically may be located at the longitudinal centre of the chassis 200. The wheels 304, 306 each include an axle that the wheel rotates about. As shown in FIG. 3 the drive system 300 comprises two axles 320, 322. Each drive wheel 304,

306 has its own associated axle. The first drive wheel 304 rotates about the first axle 320 and the second drive wheel 306 rotates about the second axle 322. Each axle defines a transverse rotational axis 324, as shown in FIG. 2. The wheels 304, 306 are arranged to be coaxial i.e., they are arranged to rotate about the same rotational axis 324. The axles are lateral to the chassis and define the rotational axis 324.

Alternatively, the wheels may be mounted on and rotatable about a lateral axle. The lateral axle may be common to both drive wheels 304, 306. The common axle may extend laterally across the chassis and may pass through both wheels and define the rotational axis 324.

The wheels 304, 306 are preferably mounted at an edge of the chassis. The wheels 304, 306 extend laterally outward from the chassis 200. The drive system 300 may be mounted on a frame. The drive system 300 may be located within or partially within a frame 330. FIG. 2 illustrates one example of frame 330 that includes the drive system 300 mounted thereon. The frame 330 is located substantially within the centre of the chassis 200. The frame 330 may define the centre of the chassis. The frame 330 may comprise a plurality of bars and may be in the form of a cage frame.

The chassis 200 may be pivotable. The chassis 200 may be pivotable about a rotational axis of the one or more drive wheels 304, 306. In one example the chassis 200 is pivotable about the axle or axles. The chassis 200 is pivotable about the rotational axis 324 that is co-axial with the axles 320, 322. The chassis 200 being pivotable the axle of both drive wheels.

The chassis 200 may comprise two plates 202, 204. The chassis comprises a first base plate 202 and a second base plate 204. The two base plates 202, 204 may be separate base plates, i.e., separate, and discrete from each other. Referring to FIG. 2 the first base plate 202 pivotably coupled to the frame 330. The second base plate 204 is also pivotably coupled to the frame 330.

In the illustrated example the first base plate 202 is coupled to frame 330 by a first pivot 206 such that the first base plate 202 can rotate i.e., pivot relative to the frame 330. The second base plate 204 is coupled to the frame 330 by a second pivot 208 such that the second base plate 204 can rotate i.e., pivot relative to the frame 330. In the illustrated example the frame may substantially stationary and does not pivot. The frame 330 provides a rigid structure to mount the wheels and allow the base plates to pivot relative to. The first base plate 202 and the second base plate may be independently rotatable relative to the frame 330. The base plates 202, 204 may be independently moveable relative to the frame 330. FIG. 2 illustrates the rotation i.e., pivoting direction A of the first base plate.

The base plates 202, 204 are pivotable about the lateral axis 324. Each base plate 202, 204 is capable of rotating relative to the lateral axis (i.e., transverse axis 324). FIG. 2 illustrates the direction the first base plate 202 can rotate about the axis 324. Each base plate 202, 204 is independently pivotable.

Alternatively, the first base plate 202 and the second base plate 204 may be pivotably coupled to each other. In a further alternative form the first base plate 202 and second base plate 204 may each be pivotably coupled to each axle of each drive wheel, and capable to pivot relative to and about the axles. In a further alternative form where the vehicle 100 comprises a single common axle through the drive wheels, the first and second base plates 202, 204 may be pivotably coupled to the common axle and rotatable about the axle.

The chassis 200 may be formed out of metal or plastic or any other rigid material. In one example the chassis 200 may be formed from stainless steel or aluminium. Each base plate 202, 204 may optionally comprise one or more peripheral braces 220 that may be formed from metal. The plate section 222 is attached to and supported by the brace 220. The plate section 222 may be formed from plastic. The first base plate 202 is shaped and structured to insert under a trolley to locate the trolley transport robot 100 in an operatively correct position to grip the trolley and move said trolley. The base plate 202 and/or 204 may fully or partially insert under the trolley to position the gripper assembly 400 in a position to grasp the target trolley. The gripper assembly 400 may be positioned at the rear of the second base plate 204.

The trolley transport vehicle may further comprise one or more non driven wheels e.g., one or more castor wheels. The non driven wheels may be freely rotatable and are not driven by a motor. In the illustrated configuration shown in FIG. 1 the vehicle comprises four castor wheels 340, 342, 344, 346. Two castor wheels are disposed substantially at a front of the vehicle and two castor wheels are disposed substantially at the rear. As seen in FIG. 1, and FIGS. 4-6 two castor wheels 340, 342 are attached to the first base plate 202. The two other castor wheels 344, 346 are attached to the rear base plate 204. The castor wheels 344, 346 are freely rotatable and assist in steering the vehicle, provide support to the vehicle, provide stability and help in maintaining contact with the ground.

Figure 4:
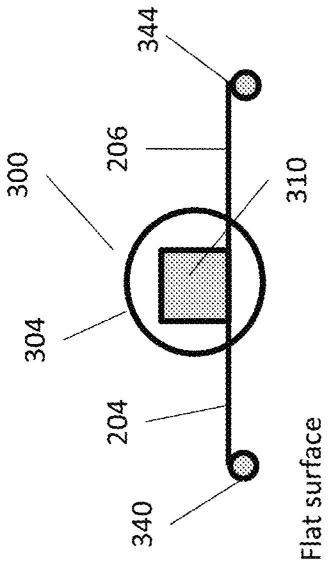
FIG. 4 illustrates a diagram the trolley transport vehicle and its chassis when moving along a flat surface.
Figure 5:
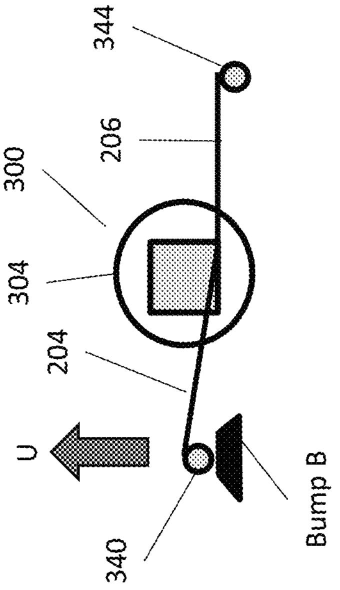
FIG. 5 illustrates the pivoting of the chassis of the trolley transport vehicle, as it passes over a bump.
Figure 6:
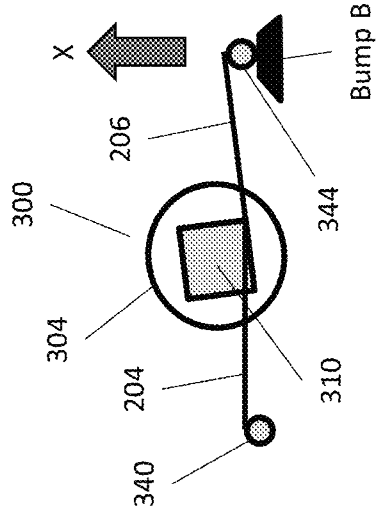
FIG. 6 illustrates the pivoting of the chassis of the trolley transport vehicle, as it passes over a bump.

FIGS. 4-6 illustrate the pivoting of the base plates. FIGS. 4-6 are a schematic that is indicative of the pivoting chassis i.e., the pivoting base plates. FIG. 4 illustrates the trolley transport vehicle 100 travelling on a flat surface. When travelling over a flat surface, the chassis 200 remains substantially planar i.e., flat. The first and second base plates 204, 206 do not pivot. FIGS. 5 and 6 illustrate the vehicle 100 travelling over a bump on the surface, the bump being denoted B. FIG. 5 shows the first base plate 202 (front base plate) pivots upward (arrow U) as the castor wheel 340 travels over the bump B. The second base plate 204, pivots upward (arrow X) as the rear castor wheel 344 travels over the bump B.

The base plates 202, 204 being pivotable decouples the drive wheels from any loads or movement caused by bumps on a surface. The base plates 202, 204 pivot to absorb any forces and movement due to the vehicle travelling over bumps or uneven surfaces. This decoupling reduces or eliminates the loads being transferred to the drive wheels. The pivoting base plates 202, 204 ensure the drive wheels remain in contact with the ground even as the vehicle moves over bumps. The pivoting of the base plates 202, 204 further reduces the chances of the vehicle tipping or falling due to the bumps since the loads from the bumps are absorbed by the pivoting action.

The trolley transport vehicle 100 comprises one or more non-contact proximity sensors disposed thereon. The one or more non-contact proximity sensors are positioned on the chassis and are configured to detect one or more objects in the environment. The non-contact sensor or sensors are configured to transmit signals, measured the reflected signal and determine the presence of one or more objects based on the reflected signals.

The one or more non-contact proximity sensors may be wave emitting sensors configured to transmit waves and detect one or more objects based on analysing reflected waves. The one or more non-contact sensors each comprise a transmitter and a receiver or may comprise a transceiver (which comprises the transmitter and receiver combined into a single unit). The transceiver is configured to transmit waves i.e., a signal and receive the reflected signals. The controller 500 is configured to receive and process the reflected signals. The controller 500 is configured to detect one or more objects.

The non-contact proximity sensors are configured to detect an object or obstacle e.g., a trolley and other obstacles in a non-contact way i.e., based on measuring and processing reflected signals.

In one example the non-contact proximity sensors may be Lidar sensors. In another example, the non-contact proximity sensors may be acoustic sensors e.g., ultrasonic sensors that are configured to transmit acoustic signals. In a further alternative the proximity sensors may be infrared sensors that are configured to transmit an infrared signal.

In one example the trolley transport vehicle comprises two non-contact proximity sensors 602, 604. A first non-contact proximity sensor 602 is positioned on the front of the chassis 200 and a second non-contact proximity sensor 604 is positioned on the rear of the chassis 200. The non-contact proximity sensors 602, 604 are configured to scan an environment to detect one or more objects. The controller 500 is configured to receive signals from the first and second non-contact proximity sensors 602, 604 and determine the presence of one or more objects e.g., the trolley or other obstacles.

Figure 11:
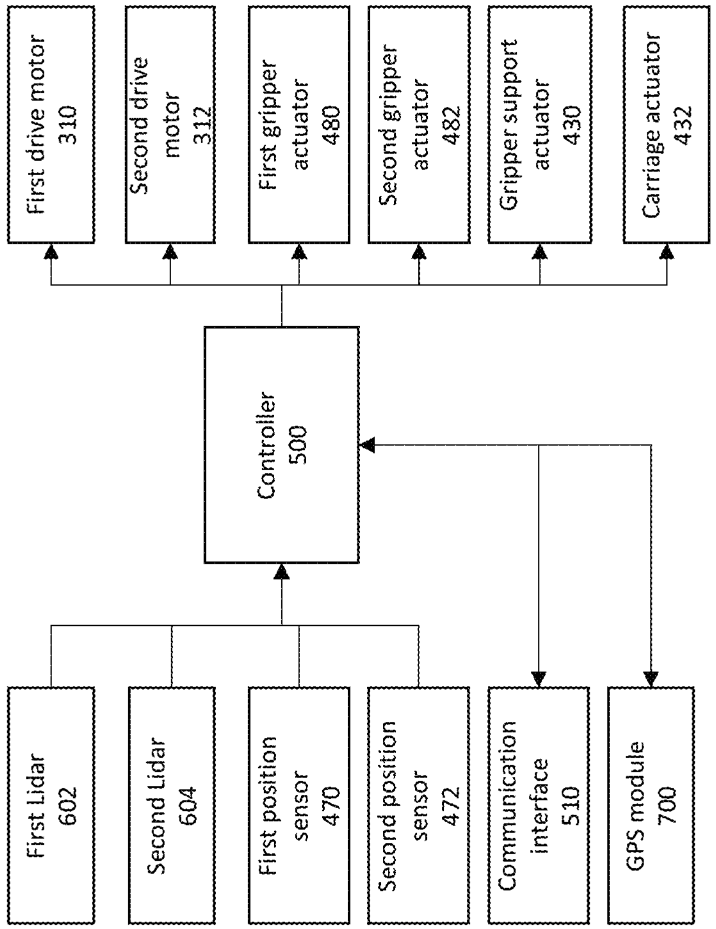
FIG. 11 illustrates a schematic diagram of the controller, its inputs from various sensors and its outputs to actuators.

In the illustrated example of FIG. 1 and FIG. 11 the trolley transport vehicle 100 comprises a first lidar sensor 602 and a second lidar sensor 604. The first lidar sensor 602 is positioned on the front of the chassis 200, as shown in FIG. 1. The second lidar sensor 604 is positioned on a rear of the chassis 200, as shown in FIG. 1. The first lidar sensor 602 and second liar sensor 604 each comprise a transceiver configured to transmit laser signals and detect reflected laser signals. The first and second lidar sensors 602, 604 are configured to transmit laser signals outwardly.

In one example the lidar sensors 602, 604 are configured to transmit laser signals in an arc e.g., a 180-degree arc or a 270-degree arc or in all directions (e.g., at 360 degrees). The sensing arc may be 270 degrees. The first lidar sensor 602 may transmit laser signals toward the front of the vehicle 100. The second lidar sensor 604 is configured to transmit laser signals toward the back of the vehicle 100. In one example the first lidar sensor 602 is configured to transmit laser signals at approximately 270 degrees from the sensor that is pointed toward the front. The second lidar sensor 604 is configured to transmit laser signals at approximately 270 degrees from the sensor that is pointed and facing the back of the vehicle. The sensing arcs of both sensors may overlap so that obstacles in any direction may be detected.

The controller 500 is electronically coupled to the first and second lidar sensors 602, 604. The controller 500 is configured to receive the reflected signals detected by the first and second lidar sensors 602, 604 as shown in FIG. 11. The controller 500 may be configured to process the received signals. The received signals may be signals reflected off one or more objects.

The controller 500 is configured to process the reflected signals to detect an object. The controller 500 may detect the position of the objects based on the time of flight of the reflected signals. For example, the controller may utilise a doppler calculation or other suitable time of flight calculation. The controller 500 is configured to determine one or more obstacles in the environment and detect a potential collision risk. The reflected signals may also be used to determine a target trolley (i.e., the trolley that needs to be transported).

The controller 500 may be configured to control the drive motors 310, 312 appropriately to stop if an obstacle is detected. The controller 500 may further be configured to control the drive motors 310, 312 to navigate around an obstacle by turning the vehicle and propelling the vehicle around one or more detected obstacles.

Figure 8:
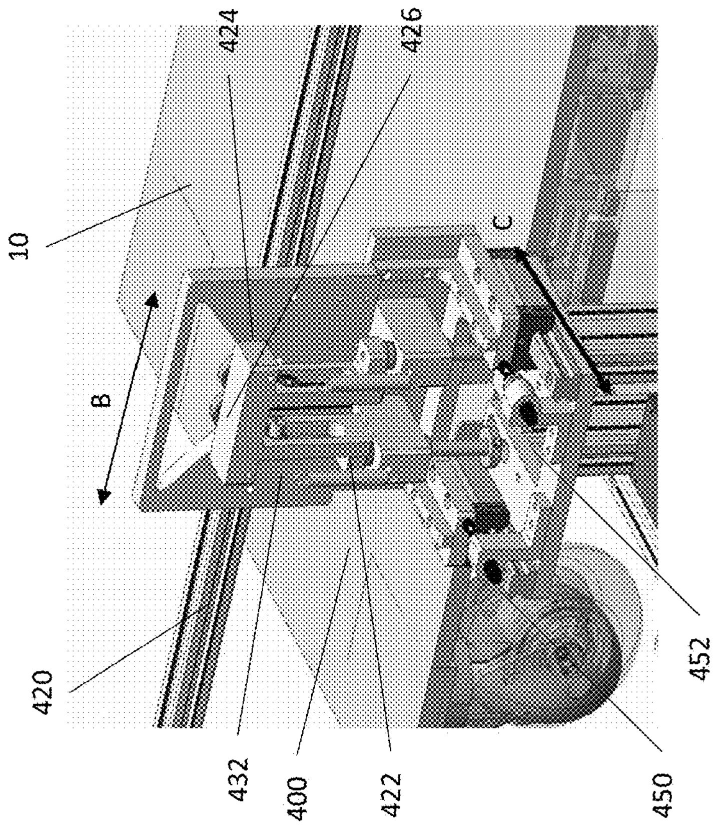
FIG. 8 illustrates a gripper rack and gripper support of the gripper assembly.
Figure 7:
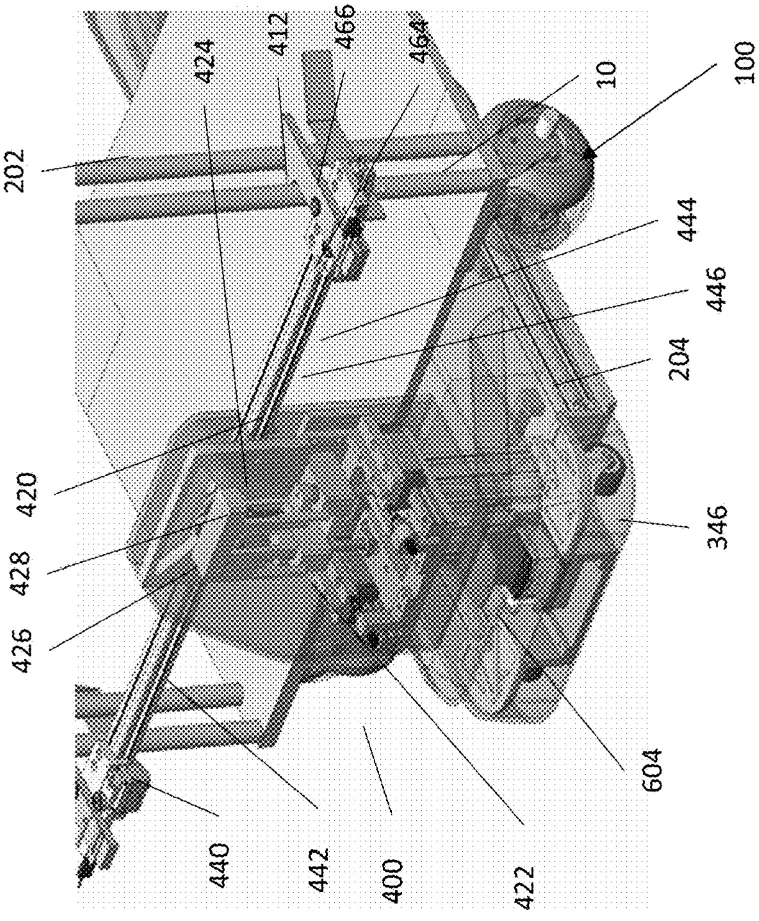
FIG. 7 illustrates the gripper assembly of the trolley transport vehicle in an operative position to engage a target trolley.
Figure 10:
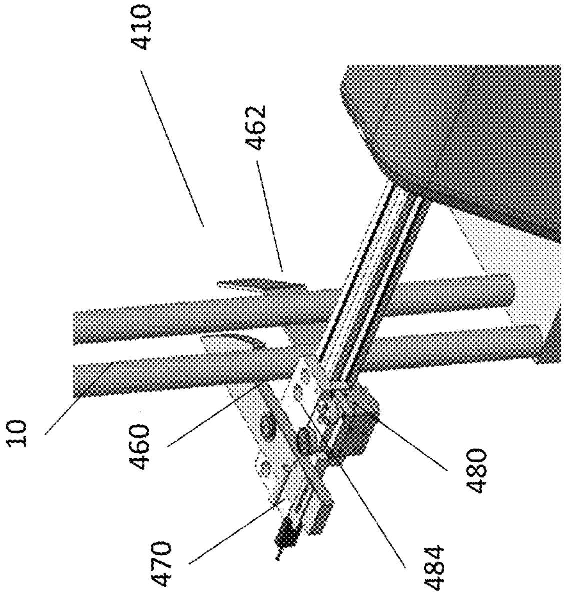
FIG. 10 illustrates an example of the first gripper and its components.

FIGS. 7 and 8 illustrate an example of the gripper assembly 400. The gripper assembly 400 comprises a gripper rack 422. The gripper rack 422 is attached to the chassis 200 and extends away from the chassis 200. As shown in FIG. 1, the gripper rack 422 extends upward from the chassis 200. The gripper rack 422 includes a support structure 424 that is configured to hold and retain the gripper support 420. The gripper support 420 may be a lateral rail. The support structure 424 may be a carriage 426 or may have carriage attached to it. The carriage 426 comprises one or more bearings or wheels. The gripper support 420 is laterally moveable as shown by direction arrows B, in FIG. 8. The carriage 426 facilitates movement of the gripper support 420 laterally. The gripper support 420 is configured to move laterally to align the grippers 410, 412 with a trolley. The gripper support 420 is configured to move horizontally to account for misalignment between the grippers 410, 412 and a target trolley 10.

The gripper support 420 comprising a telescoping arrangement 428 that is adapted to adjust the lateral distance between the grippers 410, 412. In one example the telescoping arrangement 428 comprising two horizontal rails that can move relative to each other. The two horizontal rails may define the gripper support 420.

The gripper assembly 400 comprises a first gripper 410 mounted on a free end of the gripper support and a second gripper 412 mounted on the other free end of the gripper support 420. In the illustrated example, the first gripper is mounted on a free end 440 of the first horizontal rail 442. The second gripper 412 is mounted on a free end 444 of the second horizontal rail 446.

The telescoping arrangement may comprise a gripper support actuator 430 operatively connected to the rails 442, 446 and configured to move the rails horizontally away from each other or toward each other such that the distance between the first gripper 410 and second gripper 412 is increased or decreased. The gripper support actuator 430 may be a linear motor or a stepper motor or a worm gear or other suitable actuator that is configured to move the rails laterally to create a telescoping arrangement. The gripper support actuator is not illustrated in FIG. 7 or 8.

The gripper assembly 400 comprises a carriage actuator 432. The carriage actuator 432 is coupled to the carriage 426 and is configured to actuate the carriage 426 and cause the gripper support 420 to move laterally e.g., horizontally as shown by arrows B. The carriage actuator 432 may be controlled by the controller 500. The gripper rack 422 comprises a lock mechanism that is configured to lock the gripper support 420 in position. The lock mechanism may be an auto lock mechanism that is configured to auto lock the gripper support.

The trolley transport vehicle 100 may further comprise one or more dampers. The one or more dampers may be located on the gripper support or the gripper rack. The one or more dampers are configured to absorb an impact from a trolley as the trolley transport vehicle is moved into a grasping position. As the chassis 200 is slid under the trolley, the gripper rack 422 may act as a physical limit. The dampers absorb any impact between the trolley and the rack 422. The controller 500 may configured to detect impact or engagement of the dampers to determine the vehicle is correctly under the trolley 10.

As shown in the configuration of FIG. 8, the dampers 450, 452 are positioned on the gripper rack 422. The dampers may be hydraulic dampers. The gripper support 420, and gripper rack 422 is configured to move longitudinally relative to the chassis. Longitudinally means the gripper support can move forward and backward to align the grippers 410, 412 with a target trolley.

In one example the gripper support is moveable in a forward direction C or along a longitudinal axis of the trolley transport vehicle toward the front of the chassis. The dampers 450, 452 are shaped and structured to absorb impact and move the gripper rack longitudinally as the vehicle is positioned in an operative position to engage with a target trolley. The dampers 450, 452 also absorb longitudinal loads or shocks to ensure the grippers 410, 412 do not get dislodged while they are gripping on to a target trolley 10.

As shown in FIG. 8 the trolley transport vehicle 100 comprises two dampers 450, 452. The dampers being disposed on the gripper rack 422. The dampers 450, 452 are arranged parallel to each other and oriented to be moveable parallel with a longitudinal axis of the trolley transport vehicle.

Each gripper 410, 412 comprises a clamp, a guide plate a position sensor and a gripper actuator. As shown in FIG. 7 the first gripper 410 comprises a first clamp 460 and a first guide plate 462. The first gripper 410 also comprises a first position sensor 470 mounted adjacent the clamp 460. The second gripper 412 comprises a second clamp 464 and a second guide plate 466. The second gripper 412 comprise a second position sensor 472 mounted adjacent the second clamp 464. The position sensors 470, 472 may be proximity sensors. The sensors may be non-contact sensors or may be contact sensors like limit switches. In the illustrated example the position sensors 470, 472 are configured to detect the position of the clamp 460, 464 relative to the target trolley and feed this information to the controller 500 The position sensors may be ultrasonic sensors configured to detect the position of the clamps and proximity of the target trolley.

A first gripper actuator 480 is connected to the first gripper 410 and configured to actuate the first clamp 460 between an open and closed position. A second gripper actuator 482 is connected to the second gripper 412 and configured to actuate the second clamp 464 between an open and closed position.

Figure 9:
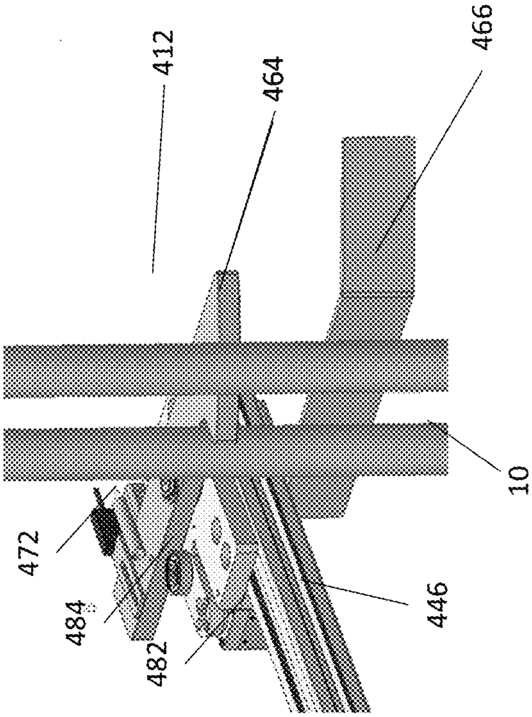
FIG. 9 illustrates an example of the second gripper and its components.

Each clamp is moveable relative to the guide plate to accommodate a portion of a trolley to grip. As shown in FIG. 9, the first clamp 460 is moveable relative to the first guide plate 462 to accommodate and grasp a portion of the trolley 10. The clamps are moveable by actuating the gripper actuators 480, 482. In one example each gripper actuator 480, 482 may be a servo motor. Each gripper 410, 412 may comprise a lock 484. The locks may be identical for both grippers 410, 412. The grippers 410, 412 may be similar or identical in structure. The locks 484 may be engageable or disengagable, such that when the lock 484 is engaged the clamp is locked and restricted from moving.

The controller 500 is configured to automatically control the gripper assembly 400 and its components to correctly align with and grip (i.e., grasp or engage) a target trolley. The trolley transport vehicle 100 may be an automated (i.e., autonomous) guided vehicle. The vehicle may be fully autonomous or may be partially autonomous e.g., may be remote controllable. The trolley transport vehicle 100 optionally may comprise a communication interface 510 operatively coupled to the controller 500. The communication interface configured to wirelessly communicate with a user device to receive one or more instructions from the user device. The user device may be mobile device or smartphone or tablet or another suitable user device. The communication interface 510 may facilitate wireless communications with a user device using a suitable wireless communication protocol e.g., Bluetooth or Wi-Fi or Zigbee or Infrared or any other wireless communication protocol. The communication interface 510 may be a wireless communication module.

The one or more instructions defining operation of the trolley transport vehicle. The controller 500 is configured to control the drive system 300 and the gripper assembly 400 to engage and move a trolley as per the instructions. In operation the communication interface 510 may receive remote instructions e.g., via a user device. The instructions may be decoded by the controller 500. The instructions may define specific movements and/or may also define a target trolley. The controller 500 is configured to control first and second drive motors 310, 312 to move the vehicle 100 into an appropriate position. The controller 500 is further configured to detect any obstacles while moving by processing the signals received from the first lidar sensor 602 and the second lidar sensor 604.

One the vehicle 100 is in position to engage the trolley, the controller 500 may be configured to detect the alignment of each gripper 410, 412 relative to the target trolley. The controller 500 is configured to receive position of the gripper from the first and second position sensors 470, 472. The first position sensor 470 is configured to provide position information of the first gripper 410, in particular the position of the first clamp 460. The second position sensor 472 is configured to provide position information of the second gripper 412, in particular the position of the second clamp 464. The controller 500 is configured to determine the relative position of each gripper (and each clamp) relative to the target trolley.

The controller 500 is configured to control gripper support actuator 430 to extend the distance between the gripper 410, 412, i.e., control the telescoping arrangement to adjust the horizontal distance between the grippers 410, 412 to align with the targe trolley. The controller 500 may further be configured to control the carriage actuator 432 to slide the gripper support 420 horizontal to align the grippers 410, 412 with the target trolley. The controller may determine alignment based on the data from the position sensors 470, 472. The guide plates 462, 466 further assist a user to visually align the vehicle. The guide plates provide a guiding surface to contact target trolley. Optionally each guide plate 462, 466 may comprise a sensor configured to detect contact. Alternatively, the guide plates may each include a position sensor or a proximity sensor. The user may provide instructions wirelessly to control the various actuators e.g., the carriage actuator or the gripper support actuator to align the grippers 410, 412 with a surface of the target trolley or a feature of a target trolley (e.g., vertical bars).

Once aligned, the controller may be configured to control the first gripper actuator 480 and the second gripper actuator 482 to actuate the clamps 460, 464. The clamps may be actuated to clamp i.e., grip or grasp or engage the target trolley. At least a surface or a feature of the target trolley 10 is grasped between the clamps 460, 464 and the corresponding guide plates. The controller 500 may be configured to move the trolley to a specified location or may be controlled by a user wirelessly to move the trolley to a specified location. Once at a specified location the clamps 460, 464 may be opened to disengage the trolley, and the vehicle (i.e., trolley transport robot) may move away.

In one example the trolley transport vehicle 100 is configured to autonomously locate and engage a trolley by the grippers and transport the trolley from one location to a destination, wherein the destination may be defined in the instructions. The trolley may be initially located by the lidar sensors 602, 604. The lidar sensors may be used for coarse object identification. The position sensors 470, 472 are then used to sense the target trolley and align the grippers 410, 412 appropriately. The controller 500 is configured to control the various actuators to align the grippers 410, 412 into an appropriate position to grip the target trolley 10, as shown in FIG. 9.

In one example the trolley transport vehicle may comprise a positioning interface 700 (i.e., a positioning module). The positioning interface 700 may be a GPS interface (i.e., a GPS module) and is configured to communicate with a guidance system e.g., a GPS system. The controller 500 may be configured to receive waypoints or a path and navigate the trolley transport vehicle 100 along the specified path. The navigation path may define a target trolley and the destination for the target trolley. The controller 500 may be configured to control the trolley transport vehicle (i.e., the trolley transport AGV) to find a target trolley, engage the target trolley (i.e., grasp it in the grippers) and then transport the engaged trolley to the defined destination.

The controller 500 can include programming instructions for detection of input conditions and control of output conditions. The programming instructions can be stored in the memory of the controller. The programming instructions can correspond to the methods, processes and functions described herein. The programming instructions can be executed by one or more hardware processors of the controller. The programming instructions can be implemented in C, C++, JAVA, or any other suitable programming languages. Some or all of the portions of the programming instructions can be implemented in application specific circuitry such as ASICs and FPGAs.

The controller 500 can also include circuits for receiving sensor signals. The controller 500 may optionally include a display for transmitting status of the patient and the respiratory assistance system. The display can also show warnings and/or other alerts. The controller may transmit warnings and messages, e.g., detected obstacles etc to a user device via the communication interface 510. Optionally the controller may receive user inputs via the user interface such as a display. The user interface can include button(s) and/or dial(s). The user interface can comprise a touch screen.

Figure 12:
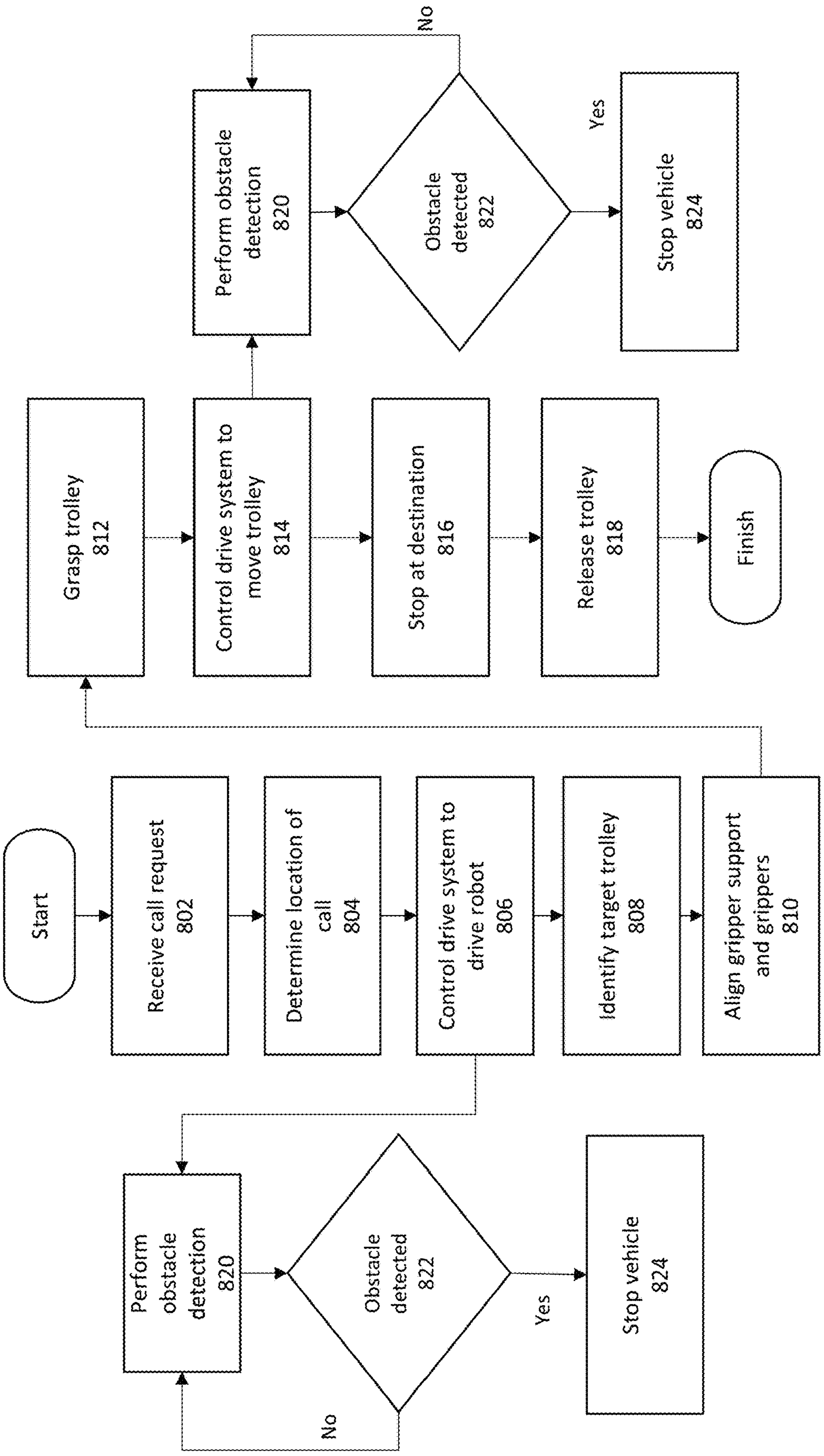
FIG. 12 illustrates a flow chart of a method of transporting a trolley using the trolley transport vehicle of FIG. 1.

FIG. 12 illustrates a method of transporting a trolley 800 using the trolley transport vehicle 100. The method 800 is one example method of an autonomous trolley transport vehicle. The method 500 may be executed by the controller 500. The method may alternatively include remote control of the trolley transport robot 100 (i.e., trolley transport vehicle) by a user via a user device such as a smartphone. The method 800 comprises step 802. Step 802 comprises receiving a call request. The robot 100 may receive the call request from a user device via the communication interface 510.

The call request may define a location. At step 804 the controller may be configured to determine the location of the call. At step 806, the controller is configured to control the drive system to drive the robot to the call location. The call location may be the location of the user or may be a specific location in an environment. The location may be determined using the GPS module 700.

Step 808 comprises identifying a target trolley based on the lidar sensor input and/or the position sensor inputs. At step 810 the controller is configured to align the grippers 410, 412 with the target trolley 10. The grippers are aligned by controlling the gripper support actuator 430 and/or the carriage actuator 432. Step 812 comprises grasping the trolley by controlling the first and second gripper actuators to control the clamps.

Step 814 comprises controlling the drive system 300 to move the trolley to a destination. The destination may be defined in the initial call request or may be defined by the user. Step 816 comprises stopping at the destination. The GPS module 700 may be used to determine if the destination has been reached. Alternatively, a user may control the robot 100 (i.e., trolley transport vehicle 100) to stop at a destination by sending a stop instruction.

Step 818 comprises releasing the trolley 10 once at the destination. The controller 500 is configured to control the first and second gripper actuators 480, 482 to release the trolley. While the trolley transport vehicle 100 is moving in an environment it performs obstacle detection. Step 820 comprises performing obstacle detection based on the first and second lidars 602, 604 and the lidar signals. An obstacle is detected based on processing the reflected laser signals. At step 822 the controller 500 determines if an obstacle is detected. If an object is detected as being too close i.e., less than a specific spacing threshold, then an obstacle is detected. If an obstacle is detected, at step 824 the vehicle 100 is stopped by disengaging the drive system 300. The steps 820 to 824 are performed each time the vehicle 100 (i.e., robot) is moving in an environment.

The method 800 is an illustrative method. The trolley transport vehicle 100 (i.e., trolley transport robot 100) may be remote controlled by a user device to drive to a trolley, grasp the trolley and transport the trolley to a destination. The vehicle is configured to perform obstacle detection using the lidar sensors and stops if an obstacle is detected while being remote controlled by a user.

The trolley transport vehicle 100 is advantageous because it provides an automated or semi-automated device to engage, and transport heavy trollies without the need for the user to exert a lot of physical force. The vehicle provides a safer and easier and more efficient tool to move heavy trollies. Using the vehicle 100 will reduce injuries for users while transporting trollies.

The trolley transport vehicle 100 (i.e., robot 100) is advantageous as it provides an automated tool that autonomously can transport trollies. The vehicle 100 further includes non-contact sensors e.g., the lidar sensors that are used for obstacle identification. This provides a safer device and reduces collisions. The vehicle includes a front lidar and a rear lidar ensuring a more accurate sensing of the environment and improved obstacle detection in at least the front and rear. The two lidars having a wide sensing arc provide obstacle detection all directions. This ensures collisions are avoided.

The trolley transport vehicle further includes sensors and a telescoping arrangement and a sliding gripper support to accurately align the grippers with a target trolley. The vehicle 100 comprises several actuators to allow for fine control and autonomous alignment with a target trolley. This is advantageous as it reduces or eliminates the need for manual or physical user intervention. The multiple actuators and sensors of the gripper assembly 400 is advantageous as the vehicle 100 can be used to grasp and transport a number of different sized and shaped trollies. The vehicle 100 provides a versatile trolley transport device. The trolley transport vehicle described herein provides a tool for safer, faster, and more efficient trolley transport in an environment.

It is noted that the embodiments may be described as a process that is depicted as a flowchart, a flow diagram, a structure diagram, or a block diagram. Although a flowchart may describe the operations as a sequential process, many of the operations can be performed in parallel or concurrently. In addition, the order of the operations may be rearranged. A process is terminated when its operations are completed. A process may correspond to a method, a function, a procedure, a subroutine, a subprogram, etc., in a computer program. When a process corresponds to a function, its termination corresponds to a return of the function to the calling function or a main function.

The methods or algorithms described in connection with the examples disclosed herein may be embodied directly in hardware, in a software module executable by a processor, or in a combination of both, in the form of processing unit, programming instructions, or other directions, and may be contained in a single device or distributed across multiple devices. A software module may reside in RAM memory, flash memory, ROM memory, EPROM memory, EEPROM memory, registers, hard disk, a removable disk, a CD-ROM, or any other form of storage medium known in the art. A storage medium may be coupled to the processor such that the processor can read information from, and write information to, the storage medium. In the alternative, the storage medium may be integral to the processor.

One or more of the components and functions illustrated the figures may be rearranged and/or combined into a single component or embodied in several components without departing from the scope of the invention. Additional elements or components may also be added without departing from the scope of the invention. Additionally, the features described herein may be implemented in software, hardware, as a business method, and/or combination thereof.

It will be appreciated by persons skilled in the art that numerous variations and/or modifications may be made to the invention as shown in the specific embodiments without departing from the spirit or scope of the invention as broadly described. The present embodiments are, therefore, to be considered in all respects as illustrative and not restrictive.

Any reference to prior art contained herein is not to be taken as an admission that the information is common general knowledge, unless otherwise indicated.

The invention claimed is:

1. A trolley transport vehicle for transporting a trolley comprising:

a chassis;

a drive system disposed on the chassis and configured to propel the trolley transport vehicle;

a gripper assembly disposed on the chassis, the gripper assembly comprising a gripper support and at least one gripper mounted on and supported by the gripper support, wherein the at least one gripper is arranged to releasably grasp a trolley;

wherein the gripper support is configured to move laterally relative to the chassis to align the grippers with a trolley and to move longitudinally relative to the chassis;

a controller operatively connected to the drive system, the controller configured to control the drive system to move the trolley transport vehicle; and the chassis configured to pivot about a central lateral axis such that the chassis tilts relative to a ground surface while the gripper support maintains said lateral and longitudinal movement relative to the chassis.

2. The trolley transport vehicle as per claim 1, wherein the drive system comprises a drive motor and one or more drive wheels, the drive wheels being positioned at a centre of the chassis, and the chassis is pivotable about a rotational axis of the one or more drive wheels.

3. The trolley transport vehicle as per claim 2, wherein the one or more drive wheels are rotatable about a lateral axle, and the chassis is pivotable about the axle of the one or more drive wheels.

4. The trolley transport vehicle as per claim 2, wherein the drive system comprises two drive wheels, the drive wheels being disposed at a centre of the chassis, the two drive wheels being coaxial and rotatable about a common axle, and the chassis being pivotable the axle of both drive wheels.

5. The trolley transport vehicle as per claim 2, wherein the chassis comprises a first base plate, a second base plate and a frame, the drive system is mounted on the frame, the frame positioned substantially in the middle of the trolley transport vehicle, the first base plate coupled to the frame by a first pivot such that the first base plate can rotate relative to the frame, the second base plate coupled to the frame by a second pivot such that the second base plate can rotate relative to the frame, the first base plate and second base plate being independently rotatable relative to the frame.

6. The trolley transport vehicle as per claim 1, comprising one or more non-contact proximity sensors, the one or more non-contact proximity sensors are positioned on the chassis and configured to detect one or more objects.

7. The trolley transport vehicle as per claim 6, wherein the one or more non-contact proximity sensors are wave emitting sensors configured to transmit waves and detect one or more objects based on analysing reflected waves.

8. The trolley transport vehicle as per claim 6, comprising two non-contact proximity sensors, a first non-contact proximity sensor positioned on the front of the chassis and a second non-contact proximity sensor positioned on the rear of the chassis, and wherein the non-contact proximity sensors are configured to scan an environment to detect one or more objects.

9. The trolley transport vehicle as per claim 8, wherein the non-contact proximity sensors are Lidar sensors.

10. The trolley transport vehicle as per claim 1, wherein the gripper support is moveable in a forward direction or along a longitudinal axis of the trolley transport vehicle toward the front of the chassis.

11. The trolley transport vehicle as per claim 1, wherein the gripper assembly comprising a gripper rack attached to the chassis and extending from the chassis, the gripper support being held by the gripper rack, the gripper support moveable laterally relative to the rack, and;

the rack comprising a lock mechanism that is configured to lock the gripper support in position.

12. The trolley transport vehicle as per claim 11, comprising one or more dampers, the one or more dampers located on the gripper support or the gripper rack, and;

wherein the one or more dampers are configured to absorb an impact from a trolley as the trolley transport vehicle is moved into a grasping position.

13. The trolley transport vehicle as per claim 12, comprising two dampers, the dampers being disposed on the gripper rack and the dampers being arranged parallel to each other and oriented to be moveable parallel with a longitudinal axis of the trolley transport vehicle.

14. The trolley transport vehicle as per claim 1, wherein the gripper support comprising a telescoping arrangement that is adapted to adjust the lateral distance between the grippers.

15. The trolley transport vehicle as per claim 14, wherein the telescoping arrangement comprising two horizontal rails that can move relative to each other, a first gripper mounted on a free end of the first horizontal rail and a second gripper mounted on a free end of the second horizontal rail, the telescoping arrangement further comprising gripper support actuator operatively connected to the rails and configured to move the rails horizontally away from each other or toward each other such that the distance between the first gripper and second gripper is increased or decreased.

16. The trolley transport vehicle as per claim 9, wherein a first Lidar sensor is positioned on a front of the chassis and is oriented to transmit light signals in forward direction, wherein a second Lidar sensor is positioned on a back of the chassis and is oriented to transmit light signals in a rearward direction, and;

wherein the transmitted light in the forward and rearward direction are used to scan an environment and detect one or more objects based on the reflected light.

17. The trolley transport vehicle as per claim 1, wherein the gripper comprising a clamp, a guide plate a position sensor and a gripper actuator, wherein the clamp is moveable relative to the guide plate to accommodate a portion of a trolley to grip, the position sensor is fixed on or adjacent the clamp and configured to sense a portion of the trolley, the gripper actuator connected to the clamp and configured to move the clamp to accommodate a portion of the trolley, and;

the gripper further comprising a lock that is engageable or disengagable, such that when the lock is engaged the clamp is locked and restricted from moving.

18. The trolley transport vehicle as per claim 1, wherein the trolley transport vehicle is an automated guided vehicle, wherein the trolley transport vehicle further comprises a communication interface operatively coupled to the controller, the communication interface configured to wirelessly communicate with a user device to receive one or more instructions from the user device, wherein the one or more instructions defining operation of the trolley transport vehicle and the controller configured to control the drive system and the gripper support to engage and move a trolley as per the instructions; and wherein the trolley transport vehicle is configured to autonomously locate and engage a trolley by the grippers and transport the trolley from one location to a destination, wherein the destination may be defined in the instructions.

19. The trolley transport vehicle as per claim 1, wherein the chassis comprises a frame, a first base plate coupled to the frame by a first pivot, and a second base plate coupled to the frame by a second pivot, such that the first and second base plates are independently rotatable relative to the frame.

20. The trolley transport vehicle as per claim 1, wherein the at least one gripper comprises a first gripper and a second gripper, and wherein the gripper assembly is configured to move the first gripper and the second gripper toward each other to clamp a portion of the trolley therebetween.

* * * * *